(12) United States Patent
Yang et al.

(10) Patent No.: US 11,240,202 B2
(45) Date of Patent: Feb. 1, 2022

(54) MESSAGE PROCESSING METHOD, ELECTRONIC DEVICE, AND READABLE STORAGE MEDIUM

(71) Applicant: Beijing Kingsoft Internet Security Software Co., Ltd., Beijing (CN)

(72) Inventors: Qi Yang, Beijing (CN); Kangzong Zhang, Beijing (CN)

(73) Assignee: Beijing Kingsoft Internet Security Software Co., Ltd., Beijing (CN)

( * ) Notice: Subject to any disclaimer, the term of this patent is extended or adjusted under 35 U.S.C. 154(b) by 1 day.

(21) Appl. No.: 16/650,768

(22) PCT Filed: Apr. 28, 2018

(86) PCT No.: PCT/CN2018/084986
§ 371 (c)(1),
(2) Date: Mar. 25, 2020

(87) PCT Pub. No.: WO2019/062114
PCT Pub. Date: Apr. 4, 2019

(65) Prior Publication Data
US 2020/0228498 A1 Jul. 16, 2020

(30) Foreign Application Priority Data

Sep. 26, 2017 (CN) .......................... 201710880742.1

(51) Int. Cl.
*G06F 9/00* (2006.01)
*H04L 29/06* (2006.01)
(Continued)

(52) U.S. Cl.
CPC ...... *H04L 63/0236* (2013.01); *H04L 12/4641* (2013.01); *H04L 61/1511* (2013.01);
(Continued)

(58) Field of Classification Search
CPC ............. H04L 63/0236; H04L 12/4641; H04L 61/1511; H04L 61/2007; H04L 63/0272;
(Continued)

(56) References Cited

U.S. PATENT DOCUMENTS 8,156,199 B1 * 4/2012 Hoche-Mong ...... H04L 63/0272
709/218
8,489,701 B2 * 7/2013 Manion ............... H04L 12/4641
709/217

(Continued)

FOREIGN PATENT DOCUMENTS

| CN | 102257760 A | 11/2011 |
|---|---|---|
| CN | 103051642 A | 4/2013 |

(Continued)

OTHER PUBLICATIONS

International Search Report dated Jul. 27, 2018, issued in connection with International Application No. PCT/CN2018/084986, filed on Apr. 28, 2018, 4 pages.

(Continued)

*Primary Examiner* — Cheikh T Ndiaye
(74) *Attorney, Agent, or Firm* — McDonnell Boehnen Hulbert & Berghoff LLP

(57) ABSTRACT

Embodiments of the present application provide a packet processing method, an electronic device and a readable storage medium. The method is applied to an electronic device installed with a Virtual Private Network VPN application, and includes: a non-VPN application in the electronic device sending a packet that is to be sent by the non-VPN application to the VPN application through a hardware network module and a virtual network module in the electronic device; the VPN application receiving and analyzing the packet; if the analysis indicates that the packet contains a Domain Name System (DNS) resolution request, the VPN application redirecting the DNS resolution request
(Continued)

packet to a preset secure DNS server through the virtual network module and the hardware network module. With embodiments of the present application, the security of software, hardware, and data of an electronic device can be effectively ensured with a reduced cost.

15 Claims, 2 Drawing Sheets

(51) Int. Cl.
    *H04L 12/46*     (2006.01)
    *H04L 29/12*     (2006.01)
    *H04L 29/08*     (2006.01)

(52) U.S. Cl.
    CPC ...... *H04L 61/2007* (2013.01); *H04L 63/0272* (2013.01); *H04L 67/02* (2013.01)

(58) Field of Classification Search
    CPC ... H04L 67/02; H04L 61/2521; H04L 67/327; H04L 69/22; H04L 29/06
    See application file for complete search history.

(56) References Cited

U.S. PATENT DOCUMENTS

| | | |
|---|---|---|
| 8,893,260 B2 | 11/2014 | Sadasivan |
| 8,990,920 B2 | 3/2015 | Pontillo et al. |
| 2017/0006452 A1 | 1/2017 | Ponnuswamy |

FOREIGN PATENT DOCUMENTS

| | | |
|---|---|---|
| CN | 104092691 A | 10/2014 |
| CN | 104092792 A | 10/2014 |
| CN | 104468269 A | 3/2015 |
| CN | 104580192 A | 4/2015 |
| CN | 105446752 A | 3/2016 |
| CN | 105991640 A | 10/2016 |

OTHER PUBLICATIONS

Written Opinion dated Jul. 27, 2018, issued in connection with International Application No. PCT/CN2018/084986, filed on Apr. 28, 2018, 3 pages.

Yang Jie, "The Design and Implementation of Remove Management System for VPN", Computer Software and Theory, 2006, 92 pages, (partial translation).

* cited by examiner

MESSAGE PROCESSING METHOD, ELECTRONIC DEVICE, AND READABLE STORAGE MEDIUM

CROSS-REFERENCE TO RELATED APPLICATIONS

The present application is a U.S. National Phase Application under 35 U.S.C. § 371 of International Application No. PCT/CN2018/084986 filed Apr. 28, 2018, which claims priority to Chinese patent application No. 201710880742.1 filed with the China National Intellectual Property Administration on Sep. 26, 2017 and entitled "MESSAGE Processing Method, Electronic Device, and Readable Storage Medium", the disclosures of each of which are incorporated herein by reference in their entirety.

TECHNICAL FIELD

The present application relates to the field of computer technology, and in particular, to a packet processing method, an electronic device, and a readable storage medium.

BACKGROUND

Nowadays, VPN (Virtual Private Network)-featured service provided by the Android system can be used to ensure the security of software, hardware, and data of an Android terminal. Specifically, a VPN application is deployed in an Android terminal, and a VPN server corresponding to the VPN application is deployed in the Internet. Further, the Android terminal encrypts a packet that needs to be sent to the Internet, and sends the encrypted packet to the VPN server to obtain feedback data corresponding to the packet from the Internet through the VPN server. The feedback data is encapsulated and encrypted before being returned to the VPN application. In this way, by means of VPN server, the Android terminal is isolated from the complicated network environment of potential security risk. As such, security can be ensured for software, hardware, and data in an Android terminal.

However, this protection scheme requires construction of a dedicated VPN server, and thus proves to be costly.

SUMMARY

Embodiments of the present application provide a packet processing method, an electronic device and a readable storage medium, which can ensure the security of software, hardware, and data of an electronic device and with reduced cost.

In a first aspect, an embodiment of the present application provides a packet processing method, applicable to an electronic device installed with a Virtual Private Network VPN application. The method includes the following steps:

a non-VPN application in the electronic device sending a packet that is to be sent by the non-VPN application to the VPN application through a hardware network module and a virtual network module in the electronic device;

the VPN application receiving and analyzing the packet; and if the analysis indicates that the packet contains a Domain Name System (DNS) resolution request, the VPN application redirecting the DNS resolution request packet to a preset secure DNS server through the virtual network module and the hardware network module.

Optionally, after the VPN application redirecting the DNS resolution request packet to a preset secure DNS server, the method further comprises:

the hardware network module sending a first feedback packet, which is received by the hardware network module from the secure DNS server and corresponds to the DNS resolution request packet, to the VPN application through the virtual network module; and the VPN application modifying a source address and a destination address of the first feedback packet, and sending the modified first feedback packet to the non-VPN application through the virtual network module and the hardware network module.

Optionally, the non-VPN application in the electronic device sending a packet that is to be sent by the non-VPN application to the VPN application through a hardware network module and a virtual network module in the electronic device comprises:

the non-VPN application in the electronic device sending the to-be-sent packet to the hardware network module in the electronic device;

the hardware network module sending the packet to the virtual network module in the electronic device based on a packet sending policy corresponding to a mangle input chain in a preset iptables; and the virtual network module sending the packet to the VPN application.

Optionally, the VPN application redirecting the DNS resolution request packet to a preset secure DNS server through the virtual network module and the hardware network module comprises:

the VPN application modifying a source address of the DNS resolution request packet to an IP address of the virtual network module, and modifying a destination address of the DNS resolution request packet to an IP address of the secure DNS server;

the VPN application sending the modified DNS resolution request packet to the hardware network module through the virtual network module; and the hardware network module receiving and sending the modified DNS resolution request packet to the secure DNS server.

Optionally, the VPN application modifying a source address and a destination address of the first feedback packet, and sending the modified first feedback packet to the non-VPN application through the virtual network module and the hardware network module comprises:

the VPN application modifying the source address of the first feedback packet to a destination address of the DNS resolution request packet, and modifying the destination address of the first feedback packet to an IP address of the hardware network module; and the VPN application sending the modified first feedback packet to the non-VPN application through the virtual network module and the hardware network module.

Optionally, after the VPN application receiving and analyzing the packet, the method further comprises:

if the analysis indicates that the packet contains a Hyper Text Transfer Protocol (HTTP) request, the VPN application obtaining a Uniform Resource Locator (URL) corresponding to the HTTP request packet and generating an HTTP authentication request packet containing the URL; wherein, the HTTP authentication request packet is a packet that requests a URL secure authentication server to perform a secure authentication on the URL;

the VPN application sending the HTTP authentication request packet to the URL secure authentication server through the virtual network module and the hardware network module.

Optionally, after sending the HTTP authentication request packet to the URL secure authentication server, the method further comprises:

the hardware network module sending a secure authentication result, which is received by the hardware network module from the URL secure authentication server and corresponds to the HTTP authentication request packet, to the VPN application through the virtual network module; and if the secure authentication result is positive, the VPN application sending the HTTP request packet to a device corresponding to the URL through the virtual network module and the hardware network module, so that the device feeds back access content for the HTTP request packet to the hardware network module.

Optionally, the VPN application obtaining a Uniform Resource Locator (URL) corresponding to the HTTP request packet and generating an HTTP authentication request packet containing the URL comprises:

the VPN application obtaining the URL corresponding to the HTTP request packet by reconstructing HTTP data stream; and generating an HTTP authentication request packet containing the URL.

In a second aspect, an embodiment of the present application provides an electronic device comprising a hardware network module, a virtual network module, a virtual private network VPN application, and a non-VPN Application;

the non-VPN Application is configured for sending a packet that is to be sent by the non-VPN application to the VPN application through the hardware network module and the virtual network module;

the VPN application is configured for receiving and analyzing the packet;

the VPN application is further configured for, if the analysis indicates that the packet contains a Domain Name System (DNS) resolution request, redirecting the DNS resolution request packet to a preset secure DNS server through the virtual network module and the hardware network module.

Optionally, the hardware network module is configured for sending a first feedback packet, which is received by the hardware network module from the secure DNS server and corresponds to the DNS resolution request packet, to the VPN application through the virtual network module;

the VPN application is further configured for modifying a source address and a destination address of the first feedback packet, and sending the modified first feedback packet to the non-VPN application through the virtual network module and the hardware network module.

Optionally, in the present embodiment, the non-VPN application is further configured for sending the to-be-sent packet to the hardware network module;

the hardware network module is further configured for sending the packet to the virtual network module based on a packet sending policy corresponding to a mangle input chain in a preset iptables;

the virtual network module is configured for sending the packet to the VPN application.

Optionally, in the present embodiment, the VPN application is further configured for, modifying a source address of the DNS resolution request packet to an IP address of the virtual network module, modifying a destination address of the DNS resolution request packet to an IP address of the secure DNS server; and sending the modified DNS resolution request packet to the hardware network module through the virtual network module;

the hardware network module is further configured for receiving and sending the modified DNS resolution request packet to the secure DNS server.

Optionally, in the present embodiment, the VPN application is further configured for modifying the source address of the first feedback packet to a destination address of the DNS resolution request packet; modifying the destination address of the first feedback packet to an IP address of the hardware network module; and sending the modified first feedback packet to the non-VPN application through the virtual network module and the hardware network module.

Optionally, in the present embodiment, the VPN application is further configured for, if the analysis indicates that the packet contains a Hyper Text Transfer Protocol (HTTP) request, obtaining a Uniform Resource Locator (URL) corresponding to the HTTP request packet and generating an HTTP authentication request packet containing the URL; wherein, the HTTP authentication request packet is a packet that requests a URL secure authentication server to perform a secure authentication on the URL; and sending the HTTP authentication request packet to the URL secure authentication server through the virtual network module and the hardware network module.

Optionally, in the present embodiment, the hardware network module is further configured for sending a secure authentication result, which is received by the hardware network module from the URL secure authentication server and corresponds to the HTTP authentication request packet, to the VPN application through the virtual network module; and the VPN application is further configured for, if the secure authentication result is positive, sending the HTTP request packet to a device corresponding to the URL through the virtual network module and the hardware network module, so that the device feeds back access content for the HTTP request packet to the hardware network module.

Optionally, in the present embodiment, the VPN application is further configured for obtaining the URL corresponding to the HTTP request packet by reconstructing HTTP data stream; and generating an HTTP authentication request packet containing the URL.

In a third aspect, an embodiment of the present application provides a computer-readable storage medium having a computer program stored thereon which, when executed by a processor, causes the processor to perform the packet processing method as described in the first aspect.

In a fourth aspect, an embodiment of the present application provides a computer program product comprising executable instructions which, when executed, perform the packet processing method as described in the first aspect.

In the embodiment of the present application, when a packet is to be sent, the non-VPN application only needs to send the packet to a VPN application via a hardware network module and a virtual network module in the electronic device. Then, the packet is analyzed by the VPN application. If the analysis indicates that the packet is a DNS resolution request packet containing a Domain Name System (DNS) resolution request, the packet is redirected to a preset secure DNS server through the virtual network module and the hardware network module. Because the secure DNS server is a DNS server pre-constructed by those skilled in the art and having ensured security, packets with potential security risk fed back by an insecure DNS server to the electronic device can be avoided. The software, hardware, and data security of an Android terminal can be ensured. In addition, since there is no need to construct a server, the cost for ensuring security of electronic device is greatly reduced.

BRIEF DESCRIPTION OF THE DRAWINGS

In order to describe the technical solutions in the embodiments of the present application or the prior art more clearly, the drawings used in the description of the embodiments or the prior art will be briefly introduced below. It is apparent that the drawings in the following description are only some embodiments of the present application. For those of ordinary skill in the art, other drawings can be obtained based on these drawings without any creative effort.

DETAILED DESCRIPTION OF THE INVENTION

The technical solutions of the embodiments of the present application will be described clearly and completely in combination of the accompanying drawings of the embodiments of the present application. It is apparent that the described embodiments are only a part of the embodiments of the present application, but not all of them. All other embodiments obtained by a person of ordinary skill in the art based on the embodiments of the present application without any creative effort fall within the protection scope of the present application.

In order to solve the existing technical problems, embodiments of the present application provide a packet processing method, an electronic device, and a readable storage medium.

A packet processing method provided by an embodiment of the present application will be described below.

Figure 1:
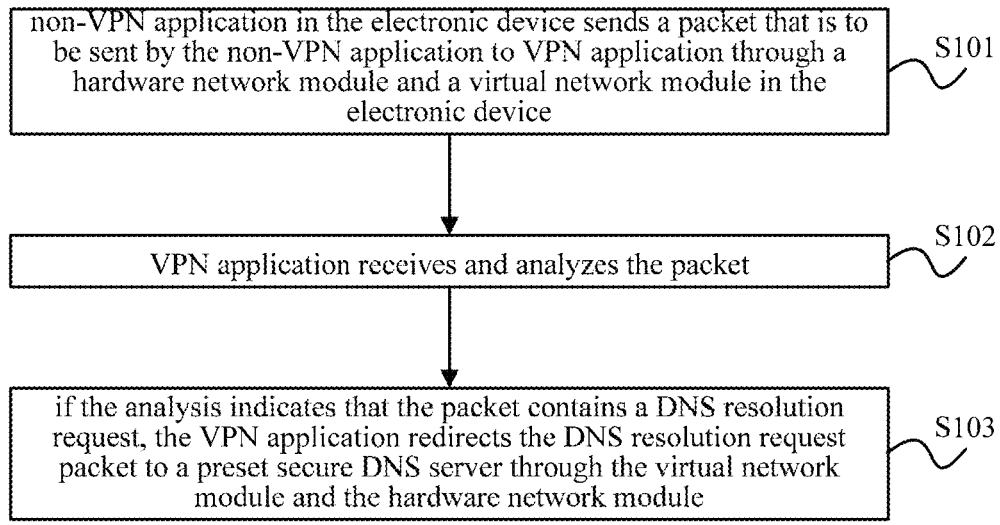
FIG. 1 is a flowchart of a packet processing method provided by an embodiment of the present application.

Referring to FIG. 1, a flowchart of a packet processing method provided by an embodiment of the present application is shown. The method is applicable to an electronic device installed with a Virtual Private Network (VPN) application, and may include the following operations.

At S101, a non-VPN application in the electronic device sends a to-be-sent packet to the VPN application through a hardware network module and a virtual network module in the electronic device.

At S102, the VPN application receives and analyzes packet;

At S103, if the analysis indicates that the packet contains a Domain Name System (DNS) resolution request packet, the VPN application redirects the DNS resolution request packet to a preset secure DNS server through the virtual network module and the hardware network module.

It can be understood that a Virtual Private Network (VPN) application and a non-VPN application are installed in the electronic device. The non-VPN application can be any application other than a VPN application. Embodiments are not limited in this.

In the embodiment of the present application, in order to ensure the security of software, hardware, and data of the electronic device, a VPN server corresponding to the VPN application is not to be constructed, so that the electronic device is not to be isolated from network environment, which is potentially risky, through the VPN server. To send a packet, the non-VPN application only needs to send the packet to a VPN application via a hardware network module and a virtual network module in the electronic device. Then, the packet is analyzed by the VPN application. If the analysis indicates that the packet is a DNS resolution request packet containing a Domain Name System (DNS) resolution request, the packet is redirected to a preset secure DNS server through the virtual network module and the hardware network module. Because the secure DNS server is a DNS server pre-constructed by those skilled in the art and having ensured security, packets with potential security risks fed back by an insecure DNS server to the electronic device can be avoided. The software, hardware, and data security of an Android terminal can be ensured. In addition, since there is no need to construct a server, the cost for ensuring security of electronic device is greatly reduced.

For clarity, a specific example of the packet processing method provided by the embodiment of the present application will be described below with reference to FIG. 2.

Figure 2:
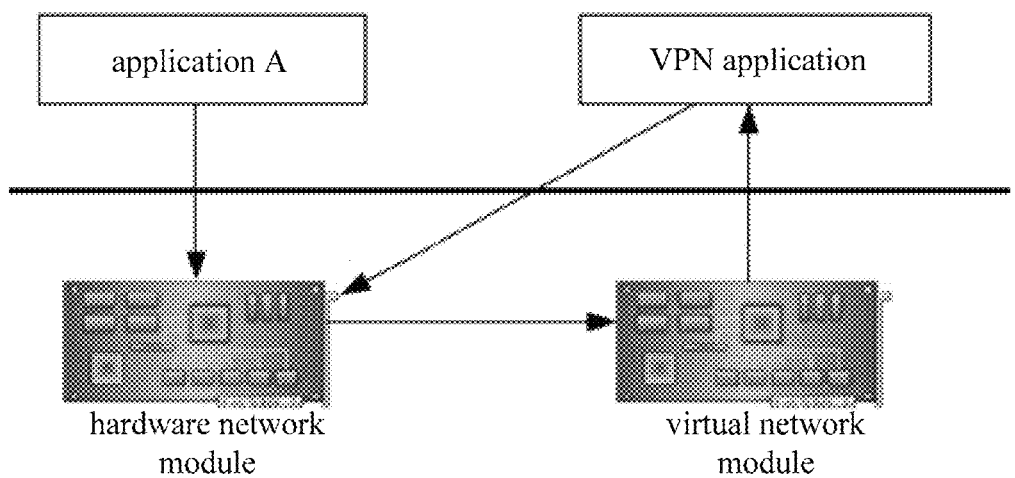
FIG. 2 is a schematic architecture of a VPN service function provided by an embodiment of the present application.

Referring to FIG. 2, the electronic device includes an application A, a VPN application, a hardware network module, and a virtual network module. The electronic device includes, but is not limited to, a mobile phone and a tablet computer including an application A, a VPN application, a hardware network module, and a virtual network module. The hardware network module includes, but is not limited to, a physical network card, and the virtual network module includes, but is not limited to, a virtual network card.

In this case, in the embodiment of the present application, there is no need to deploy a VPN server corresponding to the VPN application in the Internet. In other words, there is no need to set up a corresponding VPN server that is remote to the electronic device.

In need of packet sending, the application A simply sends the packet a to the hardware network module. After receiving the packet a, the hardware network module sends the packet a to the virtual network module based on a packet sending policy corresponding to a mangle input chain in a preset iptables in the hardware network module. The virtual network module then sends the packet a to the VPN application. The packet sending policy corresponding to the mangle input chain in the preset iptables can be formulated by a person skilled in the art according to the actual situation of the virtual network module, the detail of which is not provided here. Specifically, the virtual network module may be a tun virtual network card with tun0 ports. A tun virtual network card is known in the art, the detail thereof is not described here.

For a tun virtual network card, the VPN application can obtain the packet a forwarded to the tun virtual network card, and analyze the packet a to know the protocol type of the packet a as well as the content contained by the packet a. If the analysis indicates that the packet a is a Domain Name System (DNS) resolution request packet containing a DNS resolution request, the VPN application modifies the source address of the packet a to the IP address of the virtual network module, and modifies the destination address of the packet a to the preset IP address of the secure DNS server. Then, the VPN application sends the modified packet a to the hardware network module. In this way, after receiving the modified packet a, the hardware network module can send the modified packet a to the secure DNS server. As such, the packet a is redirected to the secure DNS server. Receipt of packets with potential security risks returned by an insecure DNS server can thus be avoided. Therefore, DNS hijacking is avoided. Since packets with potential security risks are not to be received, the security of software, hardware and data of an electronic device is guaranteed.

After receiving the modified packet a, the secure DNS server generates a secure first feedback packet containing a domain name resolution result for the modified packet a and returns the first feedback packet to the hardware network module. After receiving the first feedback packet, the hardware network module sends the received first feedback packet to the virtual network module. The virtual network module then sends the first feedback packet to the VPN application.

In this way, after receiving the first feedback packet, the VPN application modifies the source address of the first feedback packet to the destination address of the packet a, that is, the IP address of a DNS server with potential security risk to which the packet a would otherwise be sent. The destination address of the first feedback packet is modified to the source address of packet a, that is, the IP address of the hardware network module. As such, a modified first feedback packet is obtained. Then, the VPN application sends the modified first feedback packet to the virtual network module. Further, the virtual network module sends the modified first feedback packet to the hardware network module. Furthermore, the hardware network module sends the modified first feedback packet to the application A, such that the application A obtains the domain name resolution result for the packet a.

In addition, when the analysis indicates that the packet is a an Hyper Text Transfer Protocol (HTTP) request packet containing an HTTP request, the VPN application can obtain a Uniform Resource Locator (URL) corresponding to the packet a, so as to generate an HTTP authentication request packet containing the URL. In this way, a URL secure authentication server can be requested to perform secure authentication on the URL in the HTTP authentication request packet. As such, the content accessed by the electronic device can be guaranteed to be secure, and thus the security of the electronic device can be guaranteed.

If the packet a contains fields of a complete URL, the URL can be directly extracted from the packet a. If the packet a contains only some fields of the URL, the VPN application can obtain the URL corresponding to the HTTP request packet by reconstructing HTTP data stream, and the generates an HTTP authentication request packet containing the URL. HTTP data stream construction means extracting the content of the post or get field from multiple packets contain fields of the URL to restore the URL.

Specifically, the VPN application can send the HTTP authentication request packet to the URL secure authentication server through the virtual network module and the hardware network module. The URL secure authentication server then performs authentication on the security of the URL. If the URL is secure, a secure authentication result with a security identifier is returned to the electronic device. The electronic device receives the secure authentication result through the hardware network module. The hardware network module then sends the secure authentication result to the virtual network module, and the virtual network module sends the secure authentication result to the VPN application.

If the secure authentication result is positive, the VPN application sends the HTTP request packet to a device corresponding to the URL through the virtual network module and the hardware network module, so that the device feeds back access content corresponding to the URL in the HTTP request packet to the hardware network module. If the secure authentication result is negative, then the VPN application filters out the HTTP request packet, so that the electronic device will not have access to content with potential security risk. The security of the electronic device is ensured.

It should be noted that before the first data communication between the application A and the VPN application, a TCP (Transmission Control Protocol) connection needs to be established through a three-way handshake.

In summary, the embodiments of the present application can effectively ensure the security of software, hardware, and data of electronic equipment with a reduced cost.

Figure 3:
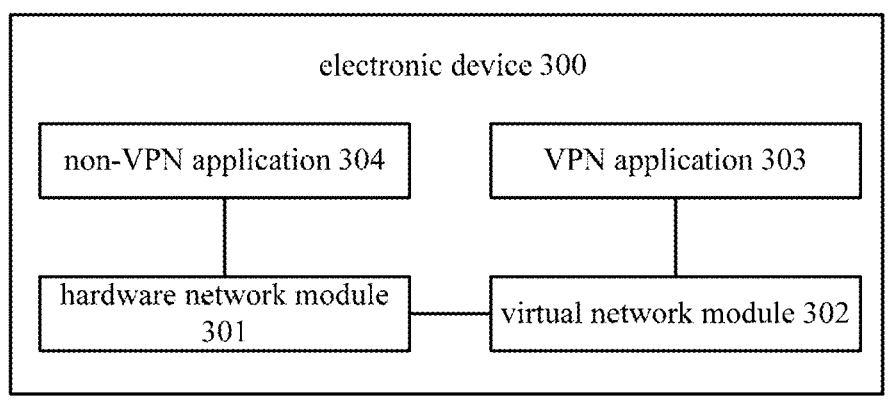
FIG. 3 is a schematic structural diagram of an electronic device provided by an embodiment of the present application.

Corresponding to the method embodiments described above, an embodiment of the present application further provides an electronic device 300. Referring to FIG. 3, the electronic device 300 includes a hardware network module 301, a virtual network module 302, a virtual private network VPN application 303, and a non-VPN Application 304.

The non-VPN Application 304 is configured for sending a to-be-sent packet to the VPN application 303 through the hardware network module 301 and the virtual network module 302.

The VPN application 303 is configured for receiving and analyzing the packet.

The VPN application 303 may be further configured for, if the analysis indicates that the packet contains a Domain Name System (DNS) resolution request, redirecting the DNS resolution request packet to a preset secure DNS server through the virtual network module 302 and the hardware network module 301.

In the embodiment of the present application, when a packet is to be sent, the non-VPN application only needs to send the packet to a VPN application via a hardware network module and a virtual network module in the electronic device. Then, the packet is analyzed by the VPN application. If the analysis indicates that the packet is a DNS resolution request packet containing a Domain Name System (DNS) resolution request, the packet is redirected to a preset secure DNS server through the virtual network module and the hardware network module. Because the secure DNS server is a DNS server pre-constructed by those skilled in the art and having ensured security, packets with potential security risk fed back by an insecure DNS server to the electronic device can be avoided. The software, hardware, and data security of an Android terminal can be ensured. In addition, since there is no need to construct a server, the cost for ensuring security of electronic device is greatly reduced.

Optionally, in an embodiment of the present application, the hardware network module 301 is configured for sending a first feedback packet, which is received by the hardware network module 301 from the secure DNS server and corresponds to the DNS resolution request packet, to the VPN application 303 through the virtual network module 302.

The VPN application 303 is further configured for modifying a source address and a destination address of the first feedback packet, and sending the modified first feedback packet to the non-VPN application 304 through the virtual network module 302 and the hardware network module 301.

Optionally, in another embodiment of the present application, the non-VPN application 304 is specifically configured for sending the to-be-sent packet to the hardware network module 301.

The hardware network module 301 is specifically configured for sending the packet to the virtual network module 302 based on a packet sending policy corresponding to a mangle input chain in a preset iptables.

The virtual network module 302 is configured for sending the packet to the VPN application 303.

Optionally, in another embodiment of the present application, the VPN application 303 is specifically configured for modifying a source address of the DNS resolution request packet to an IP address of the virtual network module 302, modifying a destination address of the DNS resolution request packet to an IP address of the secure DNS server; and sending the modified DNS resolution request packet to the hardware network module through the virtual network module 302.

The hardware network module is specifically configured for receiving and sending the modified DNS resolution request packet to the secure DNS server.

Optionally, in another embodiment of the present application, the VPN application 303 is specifically configured for modifying the source address of the first feedback packet to a destination address of the DNS resolution request packet; modifying the destination address of the first feedback packet to an IP address of the hardware network module; and sending the modified first feedback packet to the non-VPN application 304 through the virtual network module 302 and the hardware network module 301.

Optionally, in still another embodiment of the present application, the VPN application 303 is further configured for, if the analysis indicates that the packet contains a Hyper Text Transfer Protocol (HTTP) request, obtaining a Uniform Resource Locator (URL) corresponding to the HTTP request packet and generating an HTTP authentication request packet containing the URL; wherein, the HTTP authentication request packet is a packet that requests a URL secure authentication server to perform a secure authentication on the URL; and sending the HTTP authentication request packet to the URL secure authentication server through the virtual network module 302 and the hardware network module 301.

Optionally, in another embodiment of the present application, the hardware network module 301 is further configured for sending a secure authentication result, which is received by the hardware network module 301 from the URL secure authentication server and corresponds to the HTTP authentication request packet, to the VPN application through the virtual network module 302; and the VPN application 303 is further configured for, if the secure authentication result is positive, sending the HTTP request packet to a device corresponding to the URL through the virtual network module 302 and the hardware network module 301, so that the device feeds back access content for the HTTP request packet to the hardware network module 301.

Optionally, in another embodiment of the present application, the VPN application 303 is specifically configured for obtaining the URL corresponding to the HTTP request packet by reconstructing HTTP data stream; and generating an HTTP authentication request packet containing the URL.

Corresponding to the method embodiments described above, embodiments of the present application further provide a computer-readable storage medium having a computer program stored thereon which, when executed by a processor, causes the processor to perform the packet processing method provided by any of the method embodiments described above.

In the embodiment of the present application, when a packet is to be sent, the non-VPN application only needs to send the packet to a VPN application via a hardware network module and a virtual network module in the electronic device. Then, the packet is analyzed by the VPN application. If the analysis indicates that the packet is a DNS resolution request packet containing a Domain Name System (DNS) resolution request, the packet is redirected to a preset secure DNS server through the virtual network module and the hardware network module. Because the secure DNS server is a DNS server pre-constructed by those skilled in the art and having ensured security, packets with potential security risk fed back by an insecure DNS server to the electronic device can be avoided. The software, hardware, and data security of an Android terminal can be ensured. In addition, since there is no need to construct a server, the cost for ensuring security of electronic device is greatly reduced.

Corresponding to the method embodiments described above, embodiments of the present application further provide a computer program product having executable instructions which, when executed, perform the packet processing method provided by any of the method embodiments described above.

In the embodiment of the present application, when a packet is to be sent, the non-VPN application only needs to send the packet to a VPN application via a hardware network module and a virtual network module in the electronic device. Then, the packet is analyzed by the VPN application. If the analysis indicates that the packet is a DNS resolution request packet containing a Domain Name System (DNS) resolution request, the packet is redirected to a preset secure DNS server through the virtual network module and the hardware network module. Because the secure DNS server is a DNS server pre-constructed by those skilled in the art and having ensured security, packets with potential security risk fed back by an insecure DNS server to the electronic device can be avoided. The software, hardware, and data security of an Android terminal can be ensured. In addition, since there is no need to construct a server, the cost for ensuring security of electronic device is greatly reduced.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices including a series of elements include not only those elements, but also other elements not specified or the elements inherent to those processes, methods, objects, or devices. Without further limitations, an element limited by the phrase "include(s) a . . . " do not exclude that there are other identical elements in the processes, methods, objects, or devices that include that element.

Each embodiment in this specification is described in a related manner, and the same or similar parts between the various embodiments can be referred to each other. Each embodiment focuses on the differences from other embodiments. In particular, as for the device embodiment, since it is essentially similar to the method embodiment, the description is relatively simple, and the relevant part may refer to the description of the method embodiment.

The above description provides merely preferred embodiments of the present application, and is not intended to limit the protection scope of the present application. Any modification, equivalent replacement, and improvement made within the spirit and principle of this application fall within the protection scope of this application.

The invention claimed is:

1. A packet processing method, applicable to an electronic device installed with a Virtual Private Network (VPN) application and comprising:
a non-VPN application in the electronic device sending a packet that is to be sent by the non-VPN application to the VPN application through a hardware network module and a virtual network module in the electronic device;
the VPN application receiving and analyzing the packet; and
if the analysis indicates that the packet contains a Domain Name System (DNS) resolution request, the VPN application redirecting the DNS resolution request packet to a preset secure DNS server through the virtual network module and the hardware network module;
wherein, the non-VPN application in the electronic device sending a packet that is to be sent by the non-VPN application to the VPN application through a hardware network module and a virtual network module in the electronic device comprises:
the non-VPN application in the electronic device sending the to-be-sent packet to the hardware network module in the electronic device;
the hardware network module sending the packet to the virtual network module in the electronic device based on a packet sending policy corresponding to a mangle input chain in a preset iptables; and
the virtual network module sending the packet to the VPN application.

2. The method according to claim 1, wherein, after the VPN application redirecting the DNS resolution request packet to a preset secure DNS server, the method further comprises:
the hardware network module sending a first feedback packet, which is received by the hardware network module from the secure DNS server and corresponds to the DNS resolution request packet, to the VPN application through the virtual network module; and
the VPN application modifying a source address and a destination address of the first feedback packet, and sending the modified first feedback packet to the non-VPN application through the virtual network module and the hardware network module.

3. The method according to claim 2, wherein, the VPN application modifying a source address and a destination address of the first feedback packet, and sending the modified first feedback packet to the non-VPN application through the virtual network module and the hardware network module comprises:
the VPN application modifying the source address of the first feedback packet to a destination address of the DNS resolution request packet, and modifying the destination address of the first feedback packet to an IP address of the hardware network module; and
the VPN application sending the modified first feedback packet to the non-VPN application through the virtual network module and the hardware network module.

4. The method according to claim 1, wherein, the VPN application redirecting the DNS resolution request packet to a preset secure DNS server through the virtual network module and the hardware network module comprises:
the VPN application modifying a source address of the DNS resolution request packet to an IP address of the virtual network module, and modifying a destination address of the DNS resolution request packet to an IP address of the secure DNS server;
the VPN application sending the modified DNS resolution request packet to the hardware network module through the virtual network module; and
the hardware network module receiving and sending the modified DNS resolution request packet to the secure DNS server.

5. The method according to claim 1, wherein, after the VPN application receiving and analyzing the packet, the method further comprises:
if the analysis indicates that the packet contains a Hyper Text Transfer Protocol (HTTP) request, the VPN application obtaining a Uniform Resource Locator (URL) corresponding to the HTTP request packet and generating an HTTP authentication request packet containing the URL; wherein, the HTTP authentication request packet is a packet that requests a URL secure authentication server to perform a secure authentication on the URL;
the VPN application sending the HTTP authentication request packet to the URL secure authentication server through the virtual network module and the hardware network module.

6. The method according to claim 5, wherein, after sending the HTTP authentication request packet to the URL secure authentication server, the method further comprises:
the hardware network module sending a secure authentication result, which is received by the hardware network module from the URL secure authentication server and corresponds to the HTTP authentication request packet, to the VPN application through the virtual network module; and
if the secure authentication result is positive, the VPN application sending the HTTP request packet to a device corresponding to the URL through the virtual network module and the hardware network module, so that the device feeds back access content for the HTTP request packet to the hardware network module.

7. The method according to claim 5, wherein, the VPN application obtaining a Uniform Resource Locator (URL) corresponding to the HTTP request packet and generating an HTTP authentication request packet containing the URL comprises:
the VPN application obtaining the URL corresponding to the HTTP request packet by reconstructing HTTP data stream; and generating an HTTP authentication request packet containing the URL.

8. A non-transitory computer-readable storage medium having a computer program stored thereon which, when executed by a processor, causes the processor to perform the packet processing method of claim 1.

9. An electronic device, comprising a hardware network module, a virtual network module, a virtual private network (VPN) application, and a non-VPN Application;
the non-VPN Application is configured for sending a packet that is to be sent by the non-VPN application to the VPN application through the hardware network module and the virtual network module;
the VPN application is configured for receiving and analyzing the packet;
the VPN application is further configured for, if the analysis indicates that the packet contains a Domain Name System (DNS) resolution request, redirecting the DNS resolution request packet to a preset secure DNS server through the virtual network module and the hardware network module;

wherein, the non-VPN application is further configured for sending the to-be-sent packet to the hardware network module;
the hardware network module is further configured for sending the packet to the virtual network module based on a packet sending policy corresponding to a mangle input chain in a preset iptables;
the virtual network module is configured for sending the packet to the VPN application.

10. The device according to claim 9, wherein,
the hardware network module is configured for sending a first feedback packet, which is received by the hardware network module from the secure DNS server and corresponds to the DNS resolution request packet, to the VPN application through the virtual network module;
the VPN application is further configured for modifying a source address and a destination address of the first feedback packet, and sending the modified first feedback packet to the non-VPN application through the virtual network module and the hardware network module.

11. The electronic device according to claim 10, wherein,
the VPN application is further configured for modifying the source address of the first feedback packet to a destination address of the DNS resolution request packet; modifying the destination address of the first feedback packet to an IP address of the hardware network module; and sending the modified first feedback packet to the non-VPN application through the virtual network module and the hardware network module.

12. The electronic device according to claim 9, wherein,
the VPN application is further configured for, modifying a source address of the DNS resolution request packet to an IP address of the virtual network module; modifying a destination address of the DNS resolution request packet to an IP address of the secure DNS server; and sending the modified DNS resolution request packet to the hardware network module through the virtual network module;
the hardware network module is further configured for receiving and sending the modified DNS resolution request packet to the secure DNS server.

13. The electronic device according to claim 9, wherein,
the VPN application is further configured for, if the analysis indicates that the packet contains a Hyper Text Transfer Protocol (HTTP) request, obtaining a Uniform Resource Locator (URL) corresponding to the HTTP request packet and generating an HTTP authentication request packet containing the URL, wherein, the HTTP authentication request packet is a packet that requests a URL secure authentication server to perform a secure authentication on the URL; and sending the HTTP authentication request packet to the URL secure authentication server through the virtual network module and the hardware network module.

14. The electronic device according to claim 13, wherein,
the hardware network module is further configured for sending a secure authentication result, which is received by the hardware network module from the URL secure authentication server and corresponds to the HTTP authentication request packet, to the VPN application through the virtual network module; and
the VPN application is further configured for, if the secure authentication result is positive, sending the HTTP request packet to a device corresponding to the URL through the virtual network module and the hardware network module, so that the device feeds back access content for the HTTP request packet to the hardware network module.

15. The electronic device according to claim 13, wherein,
the VPN application is further configured for obtaining the URL corresponding to the HTTP request packet by reconstructing HTTP data stream; and generating an HTTP authentication request packet containing the URL.

* * * * *